(12) United States Patent
Kang et al.

(10) Patent No.: US 10,101,610 B2
(45) Date of Patent: Oct. 16, 2018

(54) DISPLAY DEVICE

(71) Applicant: Samsung Display Co., LTD., Yongin-si, Gyeonggi-Do (KR)

(72) Inventors: Euijeong Kang, Suwon-si (KR); Jung-hyun Yang, Hwaseong-si (KR); Sojeong La, Suwon-si (KR); Young-min Park, Hwaseong-si (KR); Sanghyuck Yoon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 221 days.

(21) Appl. No.: 15/013,528

(22) Filed: Feb. 2, 2016

(65) Prior Publication Data

US 2016/0274413 A1    Sep. 22, 2016

(30) Foreign Application Priority Data

Mar. 17, 2015    (KR) .................. 10-2015-0036975

(51) Int. Cl.
  *G09F 13/04*    (2006.01)
  *G09F 13/08*    (2006.01)
  *G02F 1/1335*   (2006.01)

(52) U.S. Cl.
  CPC .. *G02F 1/133608* (2013.01); *G02F 1/133603* (2013.01); *G02F 1/133605* (2013.01)

(58) Field of Classification Search
  CPC ......... G02F 1/133608; G02F 1/133603; G02F 1/133605
  USPC ....................................... 362/97.1
  See application file for complete search history.

(56) References Cited

U.S. PATENT DOCUMENTS

| 2012/0154691 A1* | 6/2012 | Cho ................. G02F 1/133604 348/739 |
| 2014/0009914 A1* | 1/2014 | Cho ......................... G09F 9/35 362/97.3 |
| 2014/0070724 A1 | 3/2014 | Gould et al. |
| 2016/0057850 A1* | 2/2016 | Kang ................. G02F 1/133308 361/749 |

FOREIGN PATENT DOCUMENTS

| KR | 1020070083355 A | 8/2007 |
| KR | 1020120039701 A | 4/2012 |
| KR | 1020130138614 A | 12/2013 |
| KR | 1020130142298 A | 12/2013 |
| KR | 1020140036461 A | 3/2014 |

* cited by examiner

*Primary Examiner* — Anh Mai
*Assistant Examiner* — Jessica M Apenteng
(74) *Attorney, Agent, or Firm* — Cantor Colburn LLP

(57) ABSTRACT

A display device includes a display panel including a display surface defined therein and curved in a first direction, and a backlight unit which provides the display panel with light. The backlight unit includes a center light source, outer light sources, and a reflective layer. The display panel includes a display surface defined therein and curved. The center light source includes center light emitting diode packages. Each of the outer light sources includes outer light emitting diode packages. The reflective layer defines a reflective surface. Each of the center light emitting diode packages is disposed on a first support surface. At least one of the outer light emitting diode packages is disposed on a second surface, which is different from the reflective layer.

19 Claims, 14 Drawing Sheets

<Chromaticity distribution>

DISPLAY DEVICE

This application claims priority to Korean Patent Application No. 10-2015-0036975, filed on Mar. 17, 2015, and all the benefits accruing therefrom under 35 U.S.C. § 119, the content of which in its entirety is herein incorporated by reference.

BACKGROUND

1. Field

The disclosure relates to a display device. More particularly, the disclosure relates to a curved display device.

2. Description of the Related Art

A flat panel display device is applied to a variety of information processing devices, such as a television set, a monitor, a notebook computer, a mobile phone, etc., to display an image. In recent years, a curved display device with a curved display surface has been developed. The curved display device provides a user with the image having improved three-dimensional effect, sense of immersion (or immersiveness), and presence of the image.

The curved display device may include a curved display panel, a backlight unit, an optical member, and a cover member. The backlight unit of such a curved display device may be classified as either an edge-illumination type backlight unit or a direct-illumination type backlight unit according to a position of a light source with respect to a display surface on which the image is displayed.

SUMMARY

The disclosure provides a curved display device having improved display quality.

An exemplary embodiment of the invention provide a display device including a display panel a display surface defined therein and curved in a first direction and a backlight unit which provides the display panel with light. In such an embodiment, the backlight unit includes a center light source, outer light sources, and a reflective layer. In such an embodiment, the center light source includes a plurality of center light emitting diode packages and is disposed at a center portion of the display panel. In such an embodiment, each of the outer light sources includes a plurality of outer light emitting diode packages, the outer light sources are arranged in the first direction such that the center light source is disposed between the outer light sources. In such an embodiment, the reflective layer reflects the light emitted from the center light source and the outer light sources and includes a reflective surface curved in the first direction. In such an embodiment, each of the center light emitting diode packages is disposed on a first support surface and one of the outer light emitting diode packages is disposed on a second support surface, which is different from the reflective surface.

In an exemplary embodiment, each of the first and second light emitting diode packages may be a top light-emitting diode package.

In an exemplary embodiment, the second support surface may be substantially parallel to an imaginary plane defined by the first direction and a second direction substantially perpendicular to the first direction.

In an exemplary embodiment, each of the outer light sources may further include a plurality of outer circuit board extending in the second direction and each of the outer circuit boards defines the second support surface.

In an exemplary embodiment, the display device may further include a bottom cover and a top cover. In such an embodiment, the bottom cover accommodates the display panel and the backlight unit and includes a bottom surface defined therein and curved in the first direction. In such an embodiment, the top cover covers the display panel and is curved in the first direction.

In an exemplary embodiment, the bottom cover includes a plurality of stepped portions, each having a protruding shape. In such an embodiment, each of the stepped portions may include a stepped surface substantially parallel to the second support surface, and one of the outer circuit boards may be disposed on the stepped surface.

In an exemplary embodiment, the bottom cover includes a plurality of stepped portions each having a recessed shape. In such an embodiment, each of the stepped portions may include a stepped surface substantially parallel to the second support surface, and one of the outer circuit boards may be disposed on the stepped surface.

In an exemplary embodiment, the display device may further include a plurality of support members disposed between the bottom cover and the outer circuit boards. In such an embodiment, a surface of each of the support members, which makes contact with a corresponding outer circuit board of the outer circuit boards, may be substantially parallel to the second support surface.

In an exemplary embodiment, when a third direction is substantially vertical to the first and second directions, an acute angle between a normal line of the second support surface and the third direction may be greater than an acute angle between a normal line of the reflective layer, which overlaps the second support surface, and the third direction.

According to exemplary embodiments described herein, the backlight unit may substantially uniformly provide the light to the center portion and the outer portions of the display panel.

BRIEF DESCRIPTION OF THE DRAWINGS

The above and other features of the invention will become readily apparent by reference to the following detailed description when considered in conjunction with the accompanying drawings, in which.

DETAILED DESCRIPTION

Figure 1:
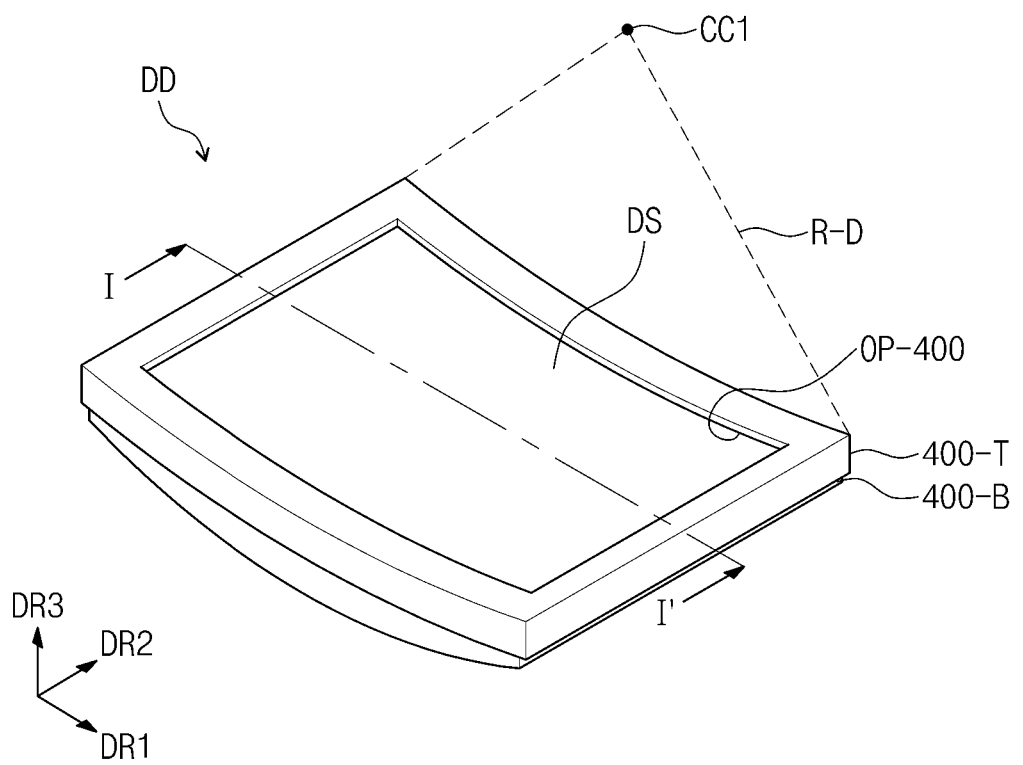
FIG. 1 is a perspective view showing an exemplary embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 2:
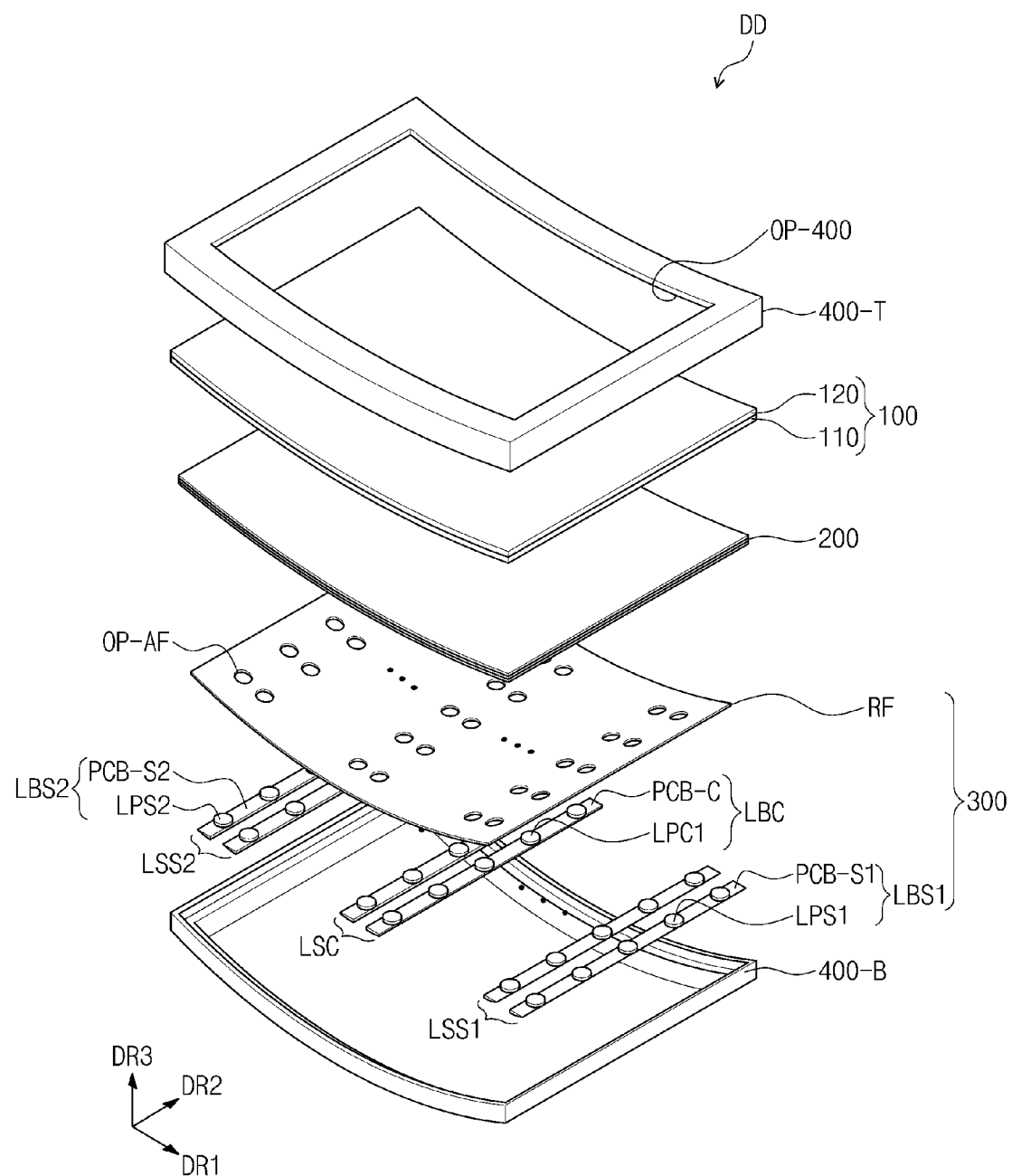
FIG. 2 is an exploded perspective view showing an exemplary embodiment of a display device according to the invention.
Figure 3:
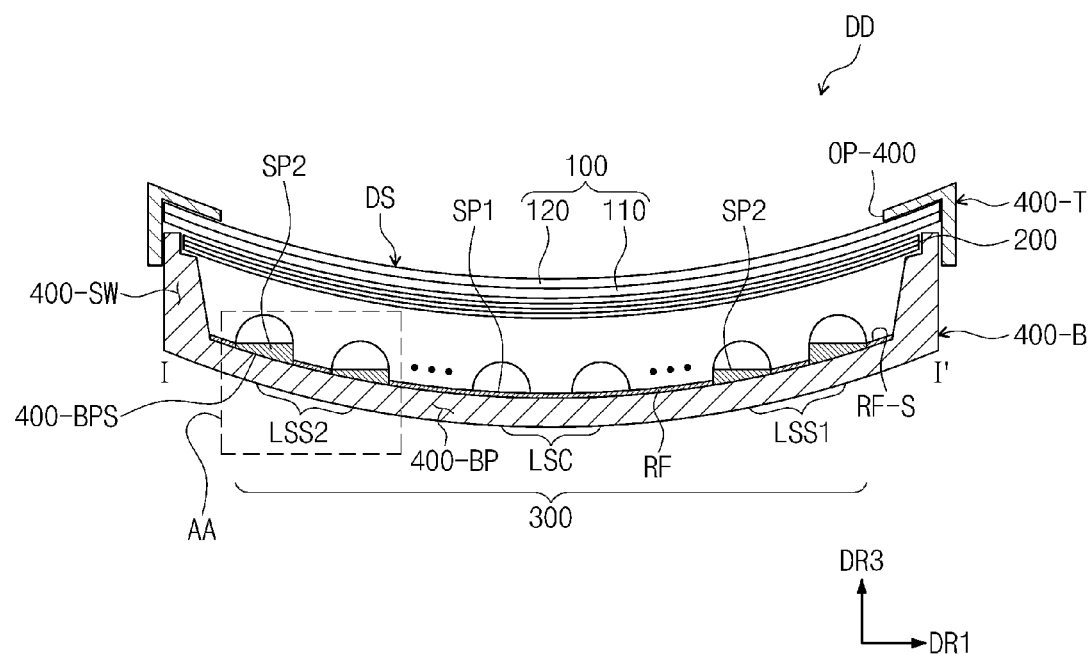
FIG. 3 is a cross-sectional view taken along line I-I' of an exemplary embodiment of the display device shown in FIG. 1.

FIG. 1 is a perspective view showing an exemplary embodiment of a display device DD according to the invention, FIG. 2 is an exploded perspective view showing an exemplary embodiment of the display device DD according to the invention, and FIG. 3 is a cross-sectional view taken along line I-I' of FIG. 1. Hereinafter, exemplary embodiments of the display device DD will be described in detail with reference to FIGS. 1 to 3.

Referring to FIGS. 1 to 3, an exemplary embodiment of the display device DD includes a display panel 100, an optical member 200, a backlight unit 300 and cover members 400-B and 400-T. In such an embodiment, although not shown in FIGS. 1 to 3, the display device DD may further include a mold member to support the display panel 100 or the optical member 200.

In an exemplary embodiment, as shown in FIG. 1, the display device DD has a predetermined curvature and a predetermined radius of curvature R-D with respect to a reference point CC1. The display device DD includes a curved display surface DS. The display surface DS is provided by or defined by a portion of the display panel 100. The radius of curvature R-D is measure from the display surface DS. In one exemplary embodiment, for example, when the display device DD has a screen size of about 65 inches, the display device DD has the radius of curvature R-D of about 4000 nanometers (nm). In an exemplary embodiment, the curvature and the radius of curvature R-D of the display device DD may be substantially the same as a curvature and a radius of curvature of the display panel 100, respectively.

When the display panel 100 is nor curved or before being curved, the display surface DS of the display panel 100 is defined by a first direction DR1 and a second direction DR2 and a thickness direction of the display panel 100 is referred to as a third direction DR3. In FIG. 1, the first direction DR1 corresponds to a horizontal direction and the second direction DR2 corresponds to a vertical direction.

Referring to FIGS. 1 to 3, the display panel 100 displays an image. The image is displayed through a display area of the display panel 100. The display panel 100 may be a non-self emissive display panel, e.g., a transflective or transmissive type display panel. Hereinafter, exemplary embodiments where the display panel 100 is a liquid crystal display panel will be described in detail.

In such an embodiment, the display panel 100 includes a first substrate 110, a second substrate 120 disposed opposite, e.g., facing, the first substrate 110, and a liquid crystal layer (not shown) disposed between the first and second substrates 110 and 120. The liquid crystal layer includes liquid crystal molecules aligned in accordance with an electric field formed between the first and second substrates 110 and 120. Although not shown in figures, polarizing plates (not shown) are respectively disposed on upper and lower portions (e.g., upper and lower outer surfaces) of the display panel 100.

The display panel 100 may be concave-curved in the first direction DR1. The display panel 100 is manufactured using the first and second substrates 110 and 120, which include or are formed of a flexible material. The display panel 100 is bent at a predetermined curvature, and then fixed to and/or coupled with the cover members 400-B and 400-T while being bent. The cover members 400-B and 400-T support the display panel 100 that tends to return to its original state, i.e., a flat state. In such an embodiment, the curvature of the cover members 400-B and 400-T is maintained by the cover members 400-B and 400-T, but not being limited thereto or thereby. In an alternative exemplary embodiment, the first and second substrates 110 and 120 may be formed in the curved shape using a rigid material, and the display panel 100 may be maintained in the curved shape without being supported by the cover members 400-B and 400-T.

The optical member 200 is disposed between the display panel 100 and the backlight unit 300 in the third direction DR3. The optical member 200 improves optical characteristics of the light from the backlight unit 300 and defines the light to the display panel 100. The optical member 200 includes a diffusion member. The diffusion member uniformly diffuses the light incident thereto. The optical member 200 may further include a prism sheet that condenses the light provided through the diffusion member and a protective sheet that protects the diffusion member and/or the prism sheet.

In an exemplary embodiment, as shown in FIGS. 2 and 3, the optical member 200 has a predetermined curvature and a predetermined radius of curvature. The curvature and the radius of curvature of the optical member 200 may be substantially the same as the curvature and the radius of curvature of the display panel 100, respectively. The optical member 200 is disposed between the display panel 100 and the backlight unit 300. The optical member 200 may be substantially parallel to the display panel 100 or the backlight unit 300. The optical member 200 may have a substantially uniform or constant thickness.

The backlight unit 300 includes a reflective layer RF and a plurality of light sources LSC, LSS1 and LSS2. The reflective layer RF may be a layer on one surface of a bottom cover 400-B in accordance with a material of the bottom cover 400-B or a material of a coating layer on the bottom cover 400-B. The reflective layer RF provides or defines a reflective surface RF-S curved in the first direction DR1. The reflective surface RF-S has the same curvature as that of the display surface DS.

In an exemplary embodiment, the light sources LSC, LSS1 and LSS2 include a center light source LSC and a plurality of outer light sources LSS1 and LSS2. The outer sources LSS1 and LSS2 may include a first outer light source LSS1 and a second outer light source LSS2. In an exemplary embodiment, as shown in FIG. 2, the center light source LSC is disposed at a center portion of the display panel 100 extending in the second direction DR2.

The center light source LSC includes a center light source block LBC. The first outer light source LSS1 includes a first outer light source block LBS1 and the second outer light source LSS2 includes a second outer light source block LBS2.

Each of the light source blocks, e.g., the center light source blocks LBC, the first outer light source blocks LBS1 and the second light source blocks LBS2, includes circuit boards PCB-C, PCB-S1 and PCB-S2 and light emitting diode packages LPC, LPS1 and LPS2. A plurality of openings OP-RF are defined or formed through the reflective layer RF to expose the light emitting diode packages LPC, LPS1 and LPS2.

The center light source LSC will hereinafter be described in greater detail. The center light source LSC includes the center light source blocks LBC. In an exemplary embodiment, a plurality of center light source blocks LBC may be arranged in the first direction DR1 and spaced apart from each other. The center light source blocks LBC include a center circuit board PCB-C extending in the second direction DR2 and center light emitting diode packages LPC disposed, e.g., mounted, on the center circuit board PCB-C. The center light emitting diode packages LPC are disposed on a first support surface SP1. The first support surface SP1 is defined or provided by the center circuit board PCB-C. In one exemplary embodiment, for example, each of the center light emitting diode package LPC is a top light-emitting diode package. FIGS. 2 and 3 show one exemplary embodiment where the center light source block LBC including five center light emitting diode packages LPC.

Hereinafter, the outer light sources LSS1 and LSS2 will be described in greater detail.

The first outer light source LSS1 includes the first outer light source blocks LBS1 extending in the second direction DR2. The first outer light source blocks LBS1 are arranged in the first direction DR1 and spaced apart from each other. The first outer light source blocks LBS1 include a first outer circuit board PCB-S1 extending in the second direction DR2 and a plurality of first outer light emitting diode packages LPS1 disposed on the first outer circuit board PCB-S1. The first outer light emitting diode packages LPS1 are disposed on a second support surface SP2. The second support surface SP2 is defined or provided by the first outer circuit board PCB-S1. Each of the first outer light emitting diode packages LPS1 may be a top light-emitting diode package. FIGS. 2 and 3 show one exemplary embodiment where the first outer light source block LBS1 including five first outer light emitting diode packages LPS1.

The second outer light source LSS2 includes the second outer light source blocks LBS2 extending in the second direction DR2. The second outer light source blocks LBS2 are arranged in the first direction DR1 and spaced apart from each other. The second outer light source blocks LBS2 include a second outer circuit board PCB-S2 extending in the second direction DR2 and a plurality of second outer light emitting diode packages LPS2 mounted on the second outer circuit board PCB-S2. The second outer light emitting diode packages LPS2 are disposed on the second support surface SP2. The second support surface SP2 is defined or provided by the second outer circuit board PCB-S2. Each of the second outer light emitting diode packages LPS1 may be the top light-emitting diode package. FIGS. 2 and 3 show one exemplary embodiment where the second outer light source block LBS2 including five second outer light emitting diode packages LPS2.

In an exemplary embodiment, the number of the outer circuit boards PCB-S1 and PCB-S2 may be "n". In such an embodiment, a first outer circuit board and an n-th outer circuit board may be disposed on the second support surface SP2 in the first direction DR1.

The cover members 400-B and 400-T include the bottom cover 400-B and a top cover 400-T. The bottom cover 400-B and the top cover 400-T coupled to the bottom cover 400-B maintain the curved shape of the display device DD. Each of the bottom cover 400-B and the top cover 400-T is a chassis or plastic mold formed by an injection or extrusion molding process or is defined by a plurality of parts, e.g., manufactured by coupling the plurality of parts.

The cover members 400-B and 400-T protect the display panel 100, the optical member 200 and the backlight unit 300. An opening OP-400 is defined or formed through the bottom cover 400-B to expose a front surface of the display panel 100, and thus the display surface DS is defined. The light sources LSC, LSS1 and LSS2 are disposed on a bottom surface (e.g., an inner surface of a bottom portion 400-BP) 400-BPS of the bottom cover 400-B. The reflective layer RF covers the circuit boards PCB-C, PCB-S1 and PCB-S2 of the light sources LSC, LSS1 and LSS2, and is disposed on the bottom surface 400-BPS. The bottom surface 400-BPS may have the same curvature as that of the reflective surface RF-S.

The bottom cover 400-B includes the bottom portion 400-BP and a sidewall 400-SW extending substantially upwardly from an edge of the bottom portion 400-BP. The bottom portion 400-BP is concavely curved. The sidewall 400-SW includes a stepped portion on an upper end thereof. Edges of the optical member 200 are disposed on and supported by the stepped portion of the sidewall 400-SW.

Figure 4:
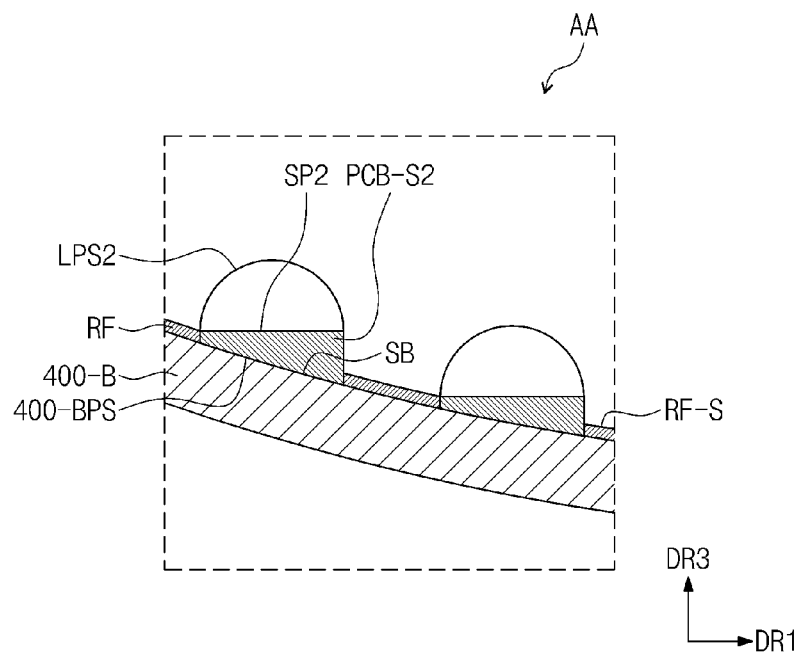
FIG. 4 is an enlarged cross-sectional view showing portion AA of an exemplary embodiment of the display device shown in FIG. 3.

FIG. 4 is an enlarged cross-sectional view showing portion AA of an exemplary embodiment of the display device shown in FIG. 3 according to the invention.

Referring to FIG. 4, in an exemplary embodiment, each of the second outer light emitting diode packages LPS2 is disposed on the second support surface SP2. The second support surface SP2 may be defined or provided by the second outer circuit board PCB-S2. The second support surface SP2 is different from the reflective surface RF-S. In such an embodiment, the second support surface SP2 is not in a same curved plane as the reflective surface RF-S, as shown in FIG. 4.

The second support surface SP2 is substantially parallel to an imaginary plane or surface defined by the first and second directions DR1 and DR2. That is, the second support surface SP2 is substantially vertical to the third direction DR3. A lower surface SB of the second outer circuit substrate PCB-S2 has substantially the same curvature as that of the reflective surface RF-S or the bottom surface 400-BPS.

The first outer light emitting diode packages LPS1 and the first outer circuit board PCB-S1 have the same structure and function as those of the second outer light emitting diode packages LPS2 and the second outer circuit board PCB-S2, and thus detailed descriptions of the first outer light emitting diode packages LPS1 and the first outer circuit board PCB-S1 will be omitted.

In an exemplary embodiment, as described above, the shapes of the outer circuit boards PCB-S1 and PCB-S2 are determined or controlled to allow brightness of the light emitting from the first and second outer light emitting diode packages LPS1 and LPS2 to be highest in the third direction DR3. This will be described later in detail with reference to FIGS. 6A, 6B, and 7.

Figure 5:
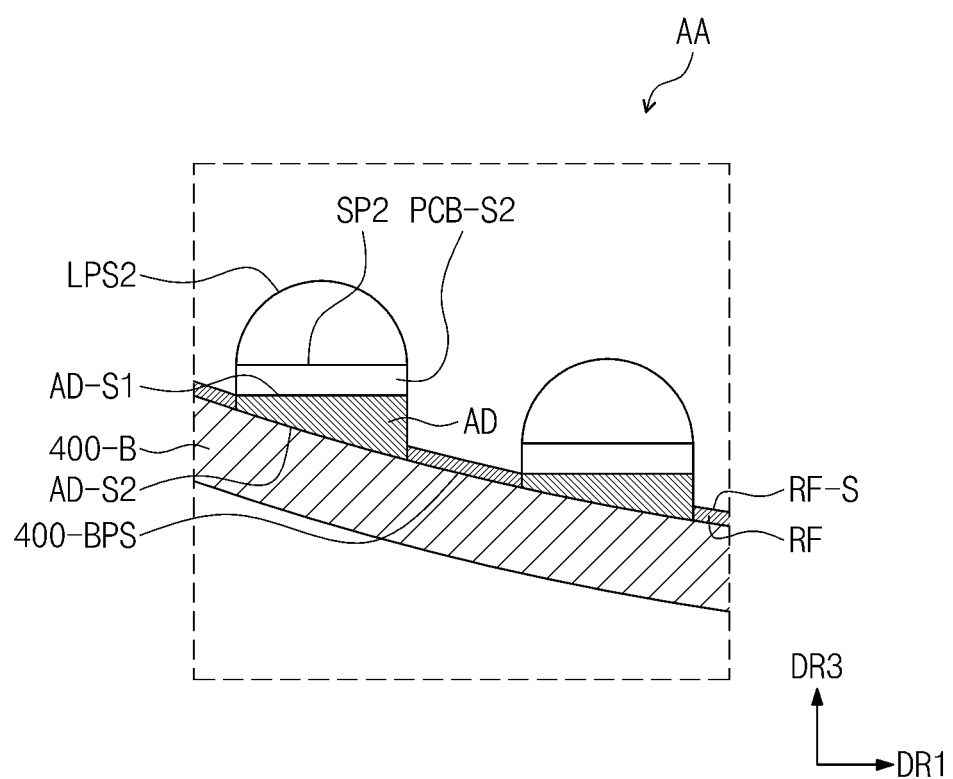
FIG. 5 is an enlarged cross-sectional view showing portion of AA of an alternative exemplary embodiment of the display device shown in FIG. 3.

FIG. 5 is an enlarged cross-sectional view showing portion AA of an exemplary embodiment of the display device shown in FIG. 3.

Referring to FIG. 5, in an alternative exemplary embodiment, support members AD are disposed between the bottom cover 400-B and the second outer circuit boards PCB-S2. Each of the support members AD includes a first surface AD-S1 and a second surface AD-S2. The second outer circuit boards PCB-S2 are disposed on the first surface AD-S1. The first surface AD-S1 is substantially parallel to the second support surface SP2. The second surface AD-S2 makes contact with the bottom surface 400-BPS. The second surface AD-S2 has substantially the same curvature as that of the reflective surface RF-S or the bottom surface 400-BPS.

In an exemplary embodiment, the support members AD may be disposed between the bottom cover 400-B and the first outer circuit boards PCB-S1. In such an embodiment, the support members AD between the bottom cover 400-B and the first outer circuit boards PCB-S1 is substantially the same as the support members AD between the bottom cover 400-B and the second outer circuit boards PCB-S2 described above, and any repetitive detailed description thereof will be omitted.

In an exemplary embodiment, as described above, the shapes of the support members AD may be determined or controlled to allow brightness of the light emitting from the first and second outer light emitting diode packages LPS1 and LPS2 to be highest in the third direction DR3.

Figure 6A:
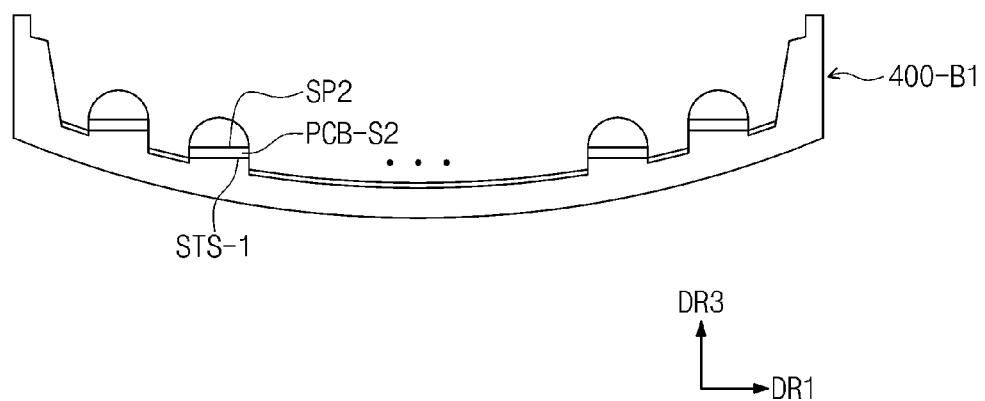
FIGS. 6A and 6B are cross-sectional views showing a portion of a backlight unit and a bottom cover of an exemplary embodiment of a display device according to the invention.
Figure 6B:
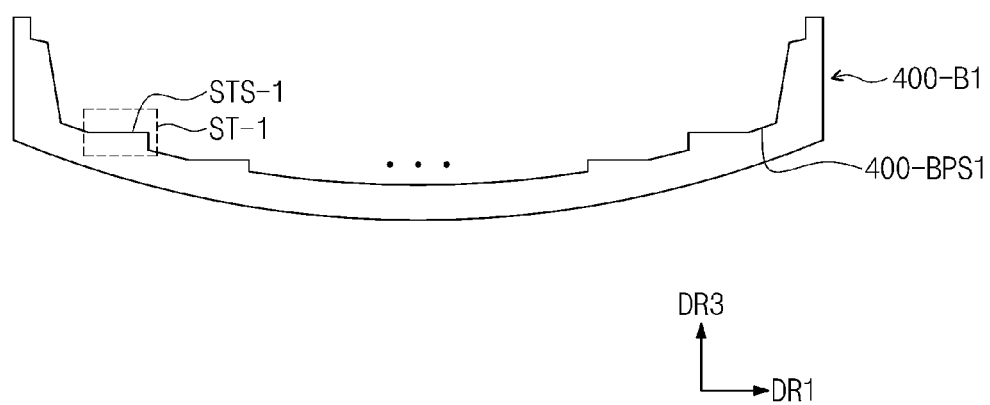
Figure 7:
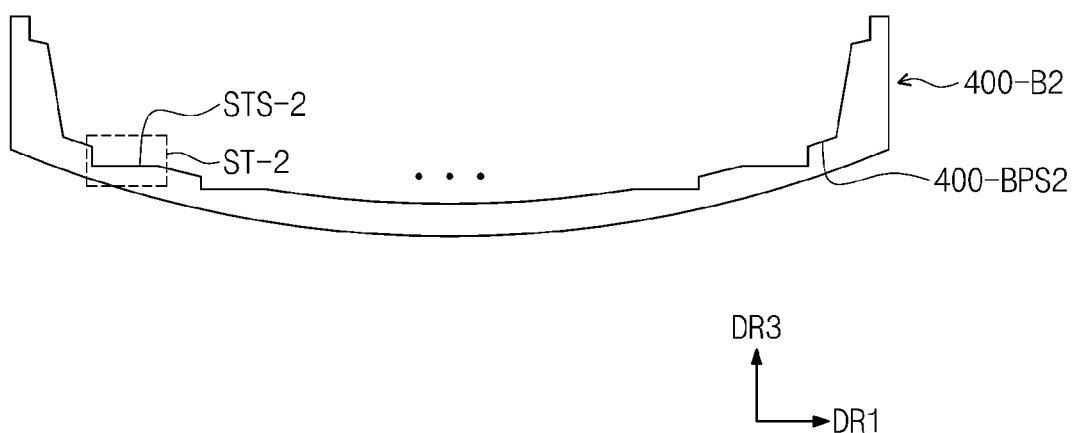
FIG. 7 is a cross-sectional view showing a bottom cover of an exemplary embodiment of a display device according to the invention.

FIGS. 6A and 6B are cross-sectional views showing a portion of a backlight unit and a bottom cover of an exemplary embodiment of a display device according to the invention and FIG. 7 is a cross-sectional view showing a bottom cover of an exemplary embodiment of a display device according to the invention.

Referring to FIGS. 6A and 6B, in an exemplary embodiment, a bottom cover 400-B1 includes a plurality of stepped portions ST-1, each having a protruding shape and defined on the bottom surface 400-BPS thereof. Each of the stepped portions ST-1 includes a stepped surface STS-1. The stepped surface STS-1 is substantially vertical to the third direction DR3.

One of the outer circuit boards PCB-S1 and PCB-S2 is disposed on the stepped surface STS-1. The stepped surface STS-1 may be substantially parallel to the second support surface SP2. The stepped portions ST-1 are not defined in a region of the bottom cover 400-B1, in which the center light source LSC (refer to FIG. 2) is disposed.

Referring to FIG. 7, a bottom cover 400-B2 includes a plurality of stepped portions ST-2, each having a recessed shape. Each of the stepped portions ST-2 includes a stepped surface STS-2. The stepped surface STS-2 is substantially vertical to the third direction DR3.

One of the outer circuit boards PCB-S1 and PCB-S2 (refer to FIG. 6A) is disposed on the stepped surface STS-2. The stepped surface STS-2 is substantially parallel to the second support surface SP2. The stepped portions ST-2 are not defined in a region of the bottom cover 400-B2, in which the center light source LSC (refer to FIG. 2) is disposed.

In an exemplary embodiment, as described above, the shapes of the stepped portions ST-1 and ST-2 are determined or controlled to allow brightness of the light emitting from the first and second outer light emitting diode packages LPS1 and LPS2 to be highest in the third direction DR3.

Figure 8A:
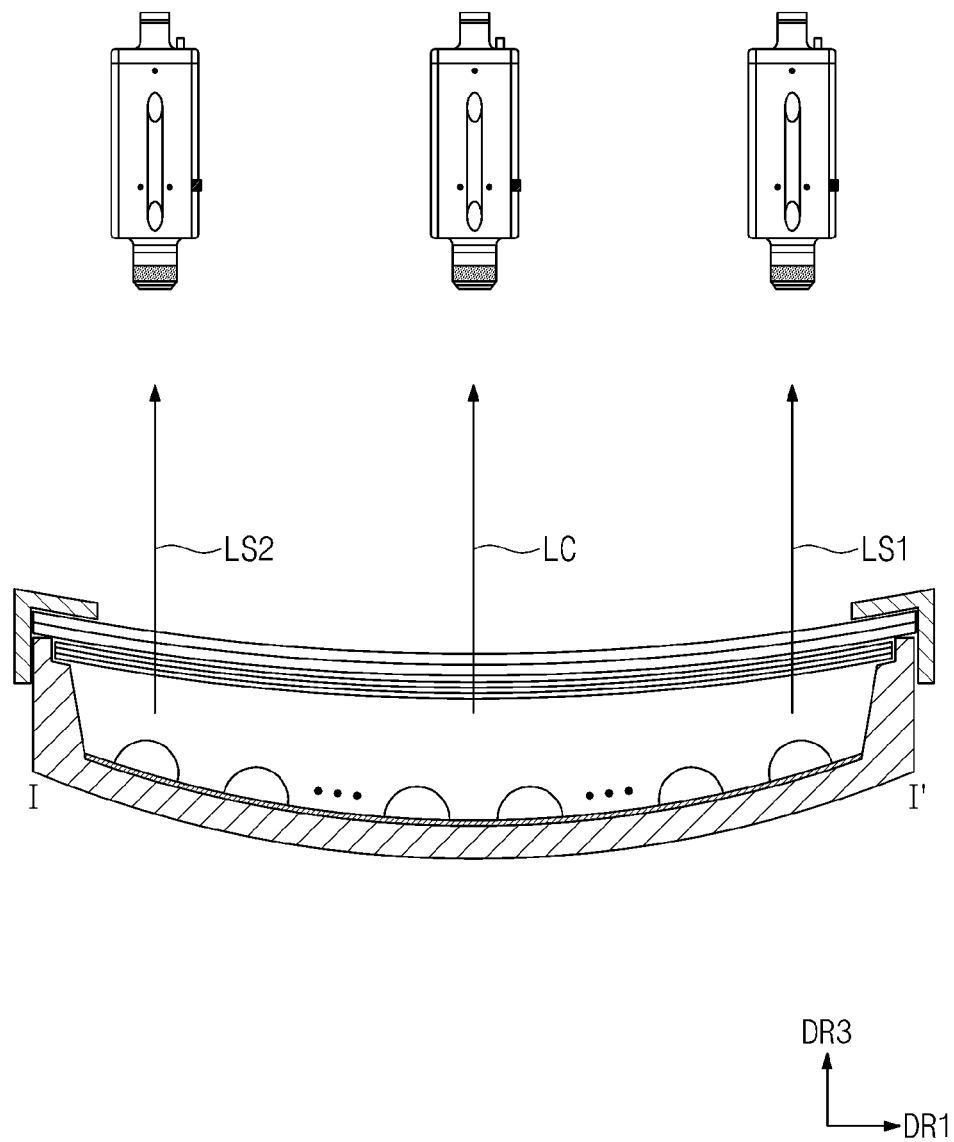
FIGS. 8A and 8B are cross-sectional views showing processes of measuring brightness of an exemplary embodiment of the invention and a comparative embodiment.
Figure 8B:
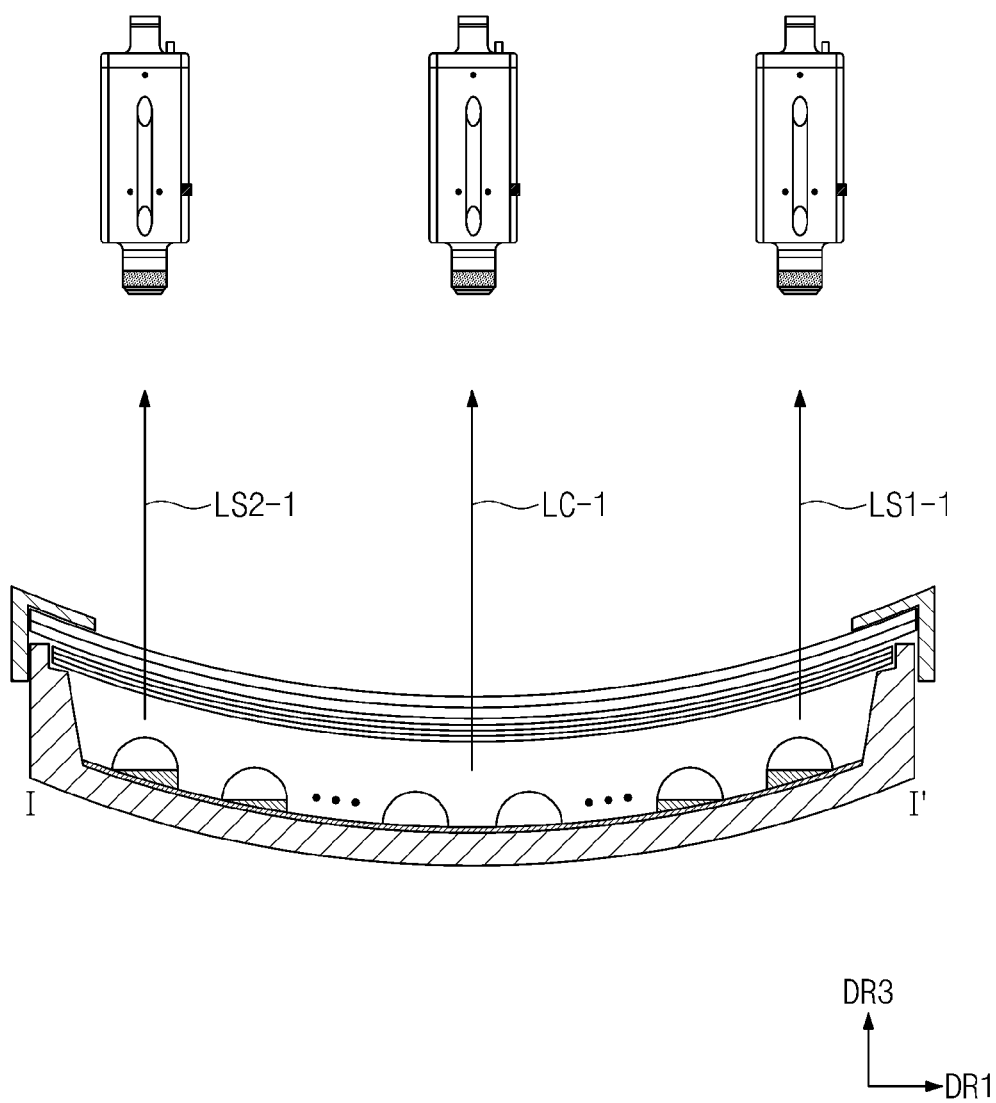
Figure 9:
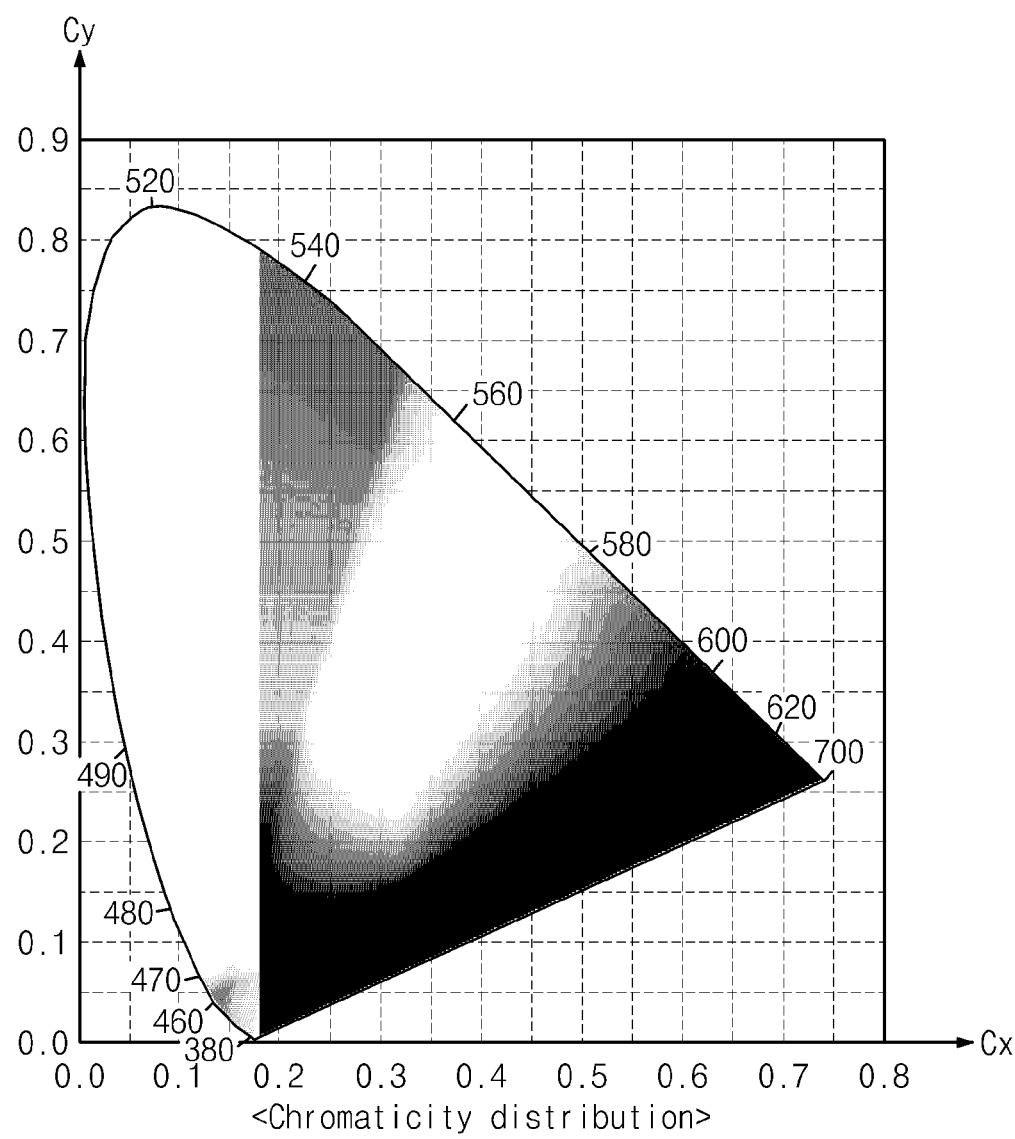
FIG. 9 is a graph showing a chromaticity distribution of a CIE1931 color space chromaticity diagram.

FIGS. 8A and 8B are cross-sectional views showing processes of measuring brightness of an exemplary embodiment of the invention and a comparative embodiment, and FIG. 9 is a graph showing a chromaticity distribution of a CIE1931 color space chromaticity diagram. The comparative embodiment shown in FIG. 8A is substantially the same as the exemplary embodiment shown in FIG. 8B except that light sources are disposed on a same continuous curved surface, as shown in FIG. 8A.

TABLE 1

| First outer light (LS1) | Chromaticity distribution | Cx | 0.2624 |
| | | Cy | 0.2203 |
| | Brightness (cd/m$^2$) | | 609.2 |
| Center light (LC) | Chromaticity distribution | Cx | 0.2600 |
| | | Cy | 0.2153 |
| | Brightness (cd/m$^2$) | | 7788 |
| Second outer light (LS2) | Chromaticity distribution | Cx | 0.2608 |
| | | Cy | 0.2183 |
| | Brightness (cd/m$^2$) | | 596.2 |

Referring to FIGS. 8A and 9, the chromaticity distribution and the brightness of the center light LC, the first outer light LS1, and the second outer light LS2, which are measured in the third direction DR3 in the comparative embodiment, are shown in Table 1.

TABLE 2

| First outer light (LS1-1) | Chromaticity distribution | Cx | 0.2622 |
| | | Cy | 0.2201 |
| | Brightness (cd/m$^2$) | | 5823 |
| Center light (LC-1) | Chromaticity distribution | Cx | 0.2600 |
| | | Cy | 0.2153 |
| | Brightness (cd/m$^2$) | | 7788 |
| Second outer light (LS2-1) | Chromaticity distribution | Cx | 0.2608 |
| | | Cy | 0.2184 |
| | Brightness (cd/m$^2$) | | 5742 |

Referring to FIGS. 8B and 9, the chromaticity distribution and the brightness of the center light LC-1, the first outer light LS1-1, and the second outer light LS2-1, which are measured in the third direction DR3 in an exemplary embodiment of the invention, are shown in Table 2.

According to Tables 1 and 2, the chromaticity distribution of the center light LC-1, the first outer light LS-1, and the second outer light LS2-1 of an exemplary embodiment of the invention is similar to the chromaticity distribution of the center light LC, the first outer light LS1, and the second outer light LS2 of the comparative embodiment.

However, the brightness of the first outer light LS1-1 and the second outer light LS2-1, which are measured in the third direction DR3 of an exemplary embodiment of the invention as shown in FIG. 8B is about ten times greater than the brightness of the first outer light LS1 and the second outer light LS2, which are measured in the third direction DR3 of the comparative embodiment as shown in FIG. 8A.

Accordingly, the brightness of the first and second outer lights LS1-1 and LS2-1, which is measured in the third direction DR3 of an exemplary embodiment of the invention, may be improved without changing the chromaticity distribution when compared to that of the comparative embodiment.

Figure 10:
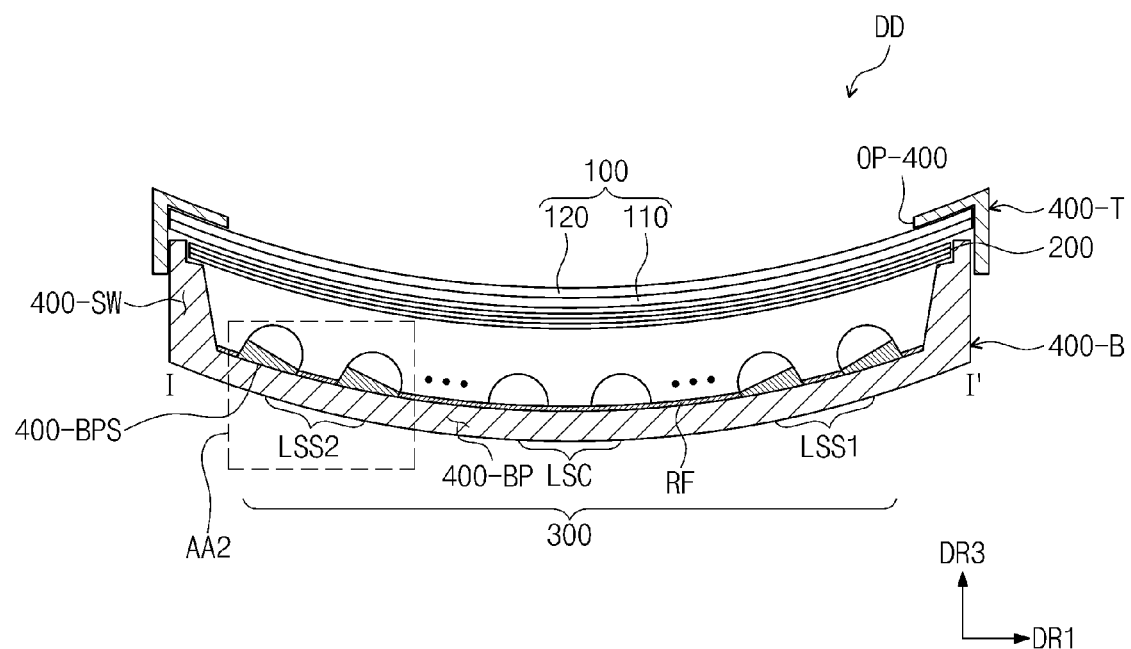
FIG. 10 is a cross-sectional view taken along line I-I' of an alternative exemplary embodiment of the display device shown in FIG. 1.
Figure 11:
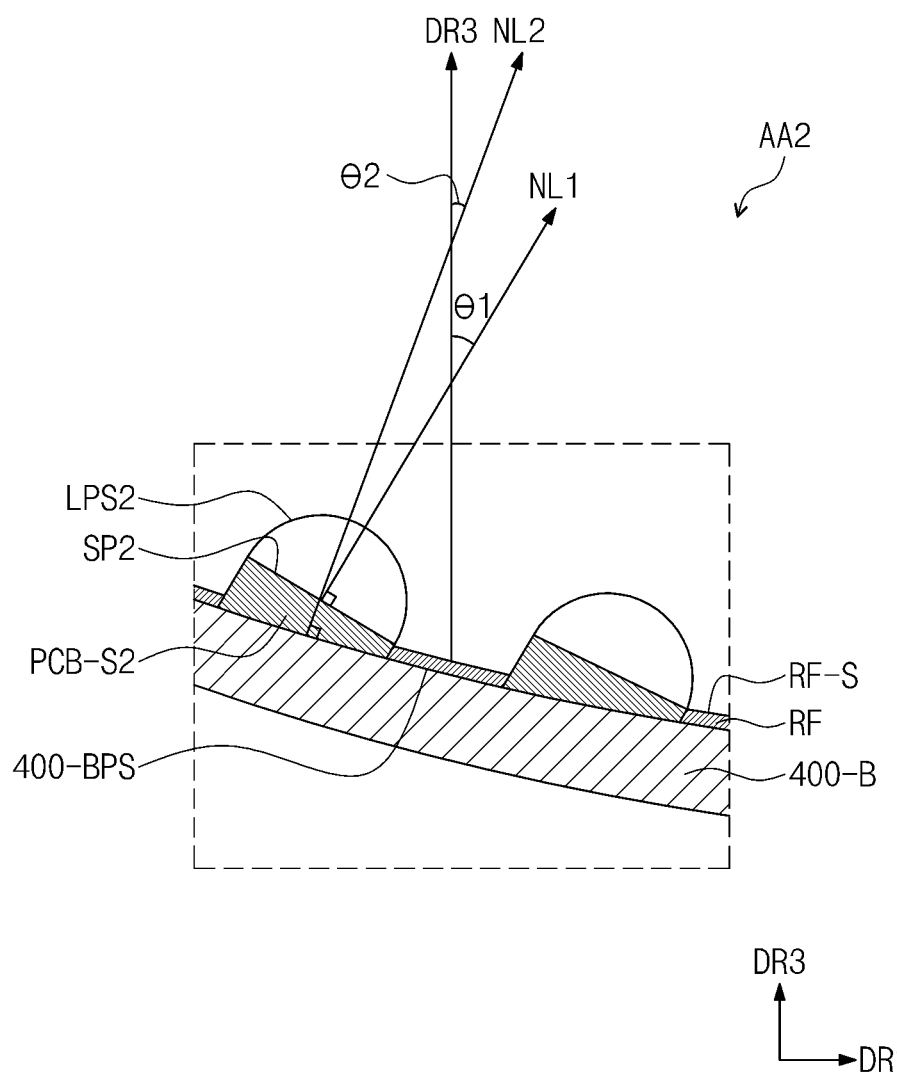
FIG. 11 is a cross-sectional view showing the portion AA2 of an exemplary embodiment of the display device shown in FIG. 10.

FIG. 10 is a cross-sectional view taken along line I-I' of an alternative exemplary embodiment of the display device shown in FIG. 1, and FIG. 11 is a cross-sectional view showing portion AA2 of an exemplary embodiment of the display device shown in FIG. 10.

Referring to FIGS. 10 and 11, in an exemplary embodiment, when an acute angle between a normal line NL1 of the second support surface SP2 and the third direction DR3 is referred to as a first angle $\theta1$ and an acute angle between a normal line NL2 of the reflective surface RF-S or the bottom surface 400-BPS corresponding to the second support surface SP2 and the third direction DR3 is referred to as a second angle $\Theta2$, the first angle $\Theta1$ is greater than the second angle $\Theta2$. In such an embodiment, one of the outer light emitting diode packages LPS1 and LPS2 is disposed on the second support surface SP2. In such an embodiment, the outer image having high brightness is provided to a viewer who views the image displayed in the display panel 100 at a position corresponding to a center position of the display panel 100.

Figure 12:
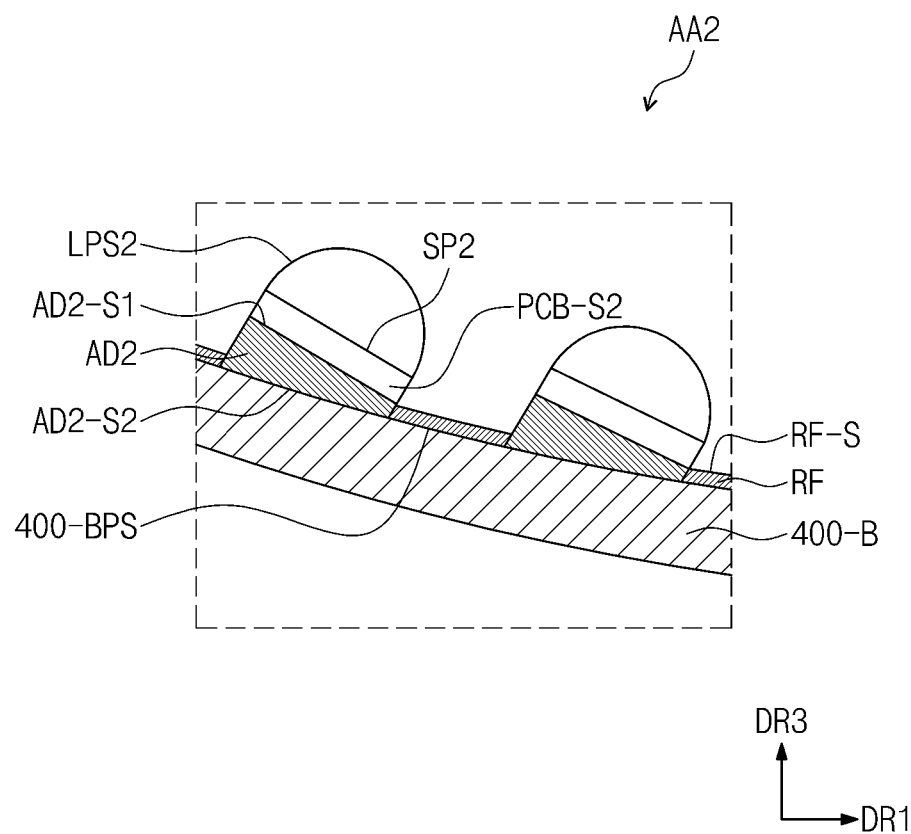
FIG. 12 is a cross-sectional view showing the portion AA2 of an alternative exemplary embodiment of the display device shown in FIG. 10.

FIG. 12 is a cross-sectional view showing portion of AA2 of an alternative exemplary embodiment of the display device shown in FIG. 10.

Referring to FIG. 12, in an exemplary embodiment, support members AD2 are disposed between the bottom cover 400-B and the second outer circuit boards PCB-S2. Each of the support members AD includes a first surface AD2-S1 and a second surface AD2-S2. The second outer circuit boards PCB-S2 are disposed on the first surface AD2-S1. The first surface AD2-S1 is substantially parallel to the second support surface SP2. The second surface AD2-S2 makes contact with the bottom surface 400-BPS. The second surface AD2-S2 has substantially the same curvature as that of the reflective surface RF-S or the bottom surface 400-BPS.

In such an embodiment, the support members AD2 may be disposed between the bottom cover 400-B and the first outer circuit boards PCB-S1 (refer to FIG. 10). In such an embodiment, the support members AD2 between the bottom cover 400-B and the first outer circuit boards PCB-S1 is substantially the same as the support members AD2 between the bottom cover 400-B and the second outer circuit boards PCB-S2 described above, and any repetitive detailed description thereof will be omitted.

In an exemplary embodiment, as described above, the shapes of the support members AD2 may be determined or controlled such that brightness of the light emitting from the first and second outer light emitting diode packages LPS1 and LPS2 may be improved in the center portion of the display panel 100 (refer to FIG. 2).

Figure 13:
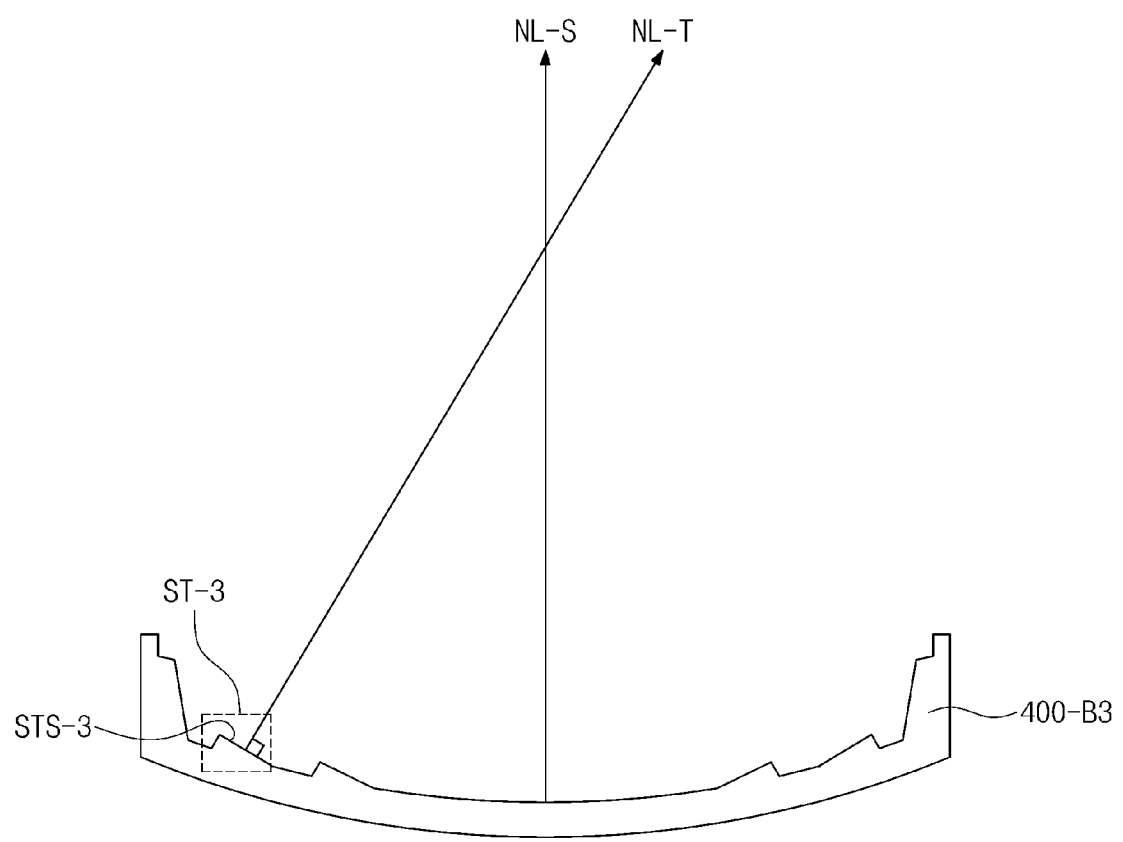
FIGS. 13 and 14 are cross-sectional views showing a bottom cover of an exemplary embodiment of the display device according to the invention.
Figure 14:
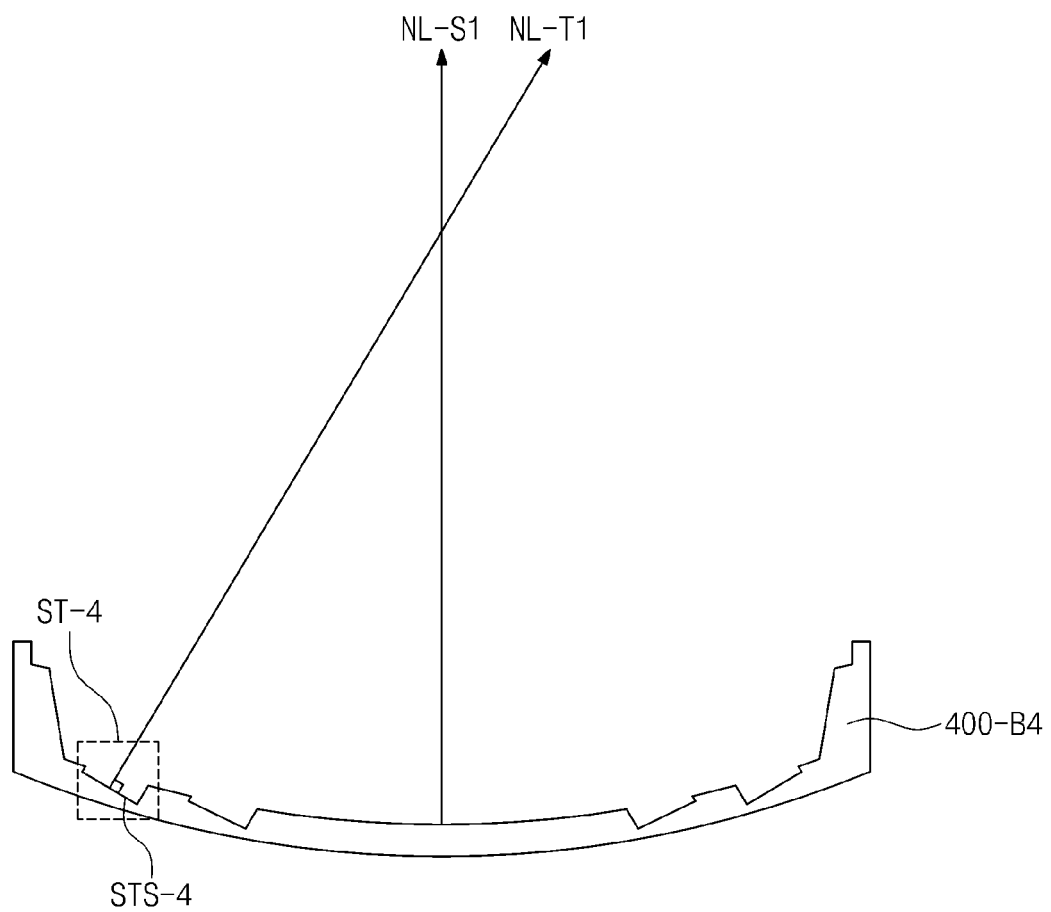

FIGS. 13 and 14 are cross-sectional views showing an exemplary embodiment of a bottom cover according to the invention.

Referring to FIG. 13, an exemplary embodiment of a bottom cover 400-B3 includes a plurality of stepped portions ST-3, each having a protruding shape. Each of the stepped portions ST-2 includes a stepped surface STS-3. A normal line NL-T of the stepped surface STS-3 crosses a normal line NL-S of the first support surface SP1.

One of the outer circuit boards PCB-S1 and PCB-S2 is disposed on the stepped surface STS-3. The stepped surface STS-3 is substantially parallel to the second support surface SP2. The stepped portions ST-3 are not disposed in a region of the bottom cover 400-B3, in which the center light source LSC (refer to FIG. 2) is disposed.

Referring to FIG. 14, a bottom cover 400-B4 includes a plurality of stepped portions ST-4, each having a recessed shape. Each of the stepped portions ST-4 includes a stepped surface STS-4. A normal line NL-T1 of the stepped surface STS-4 crosses a normal line NL-S1 of the first support surface SP1.

One of the outer circuit boards PCB-S1 and PCB-S2 is disposed on the stepped surface STS-4. The stepped surface STS-4 is substantially parallel to the second support surface SP2. The stepped portions ST-4 are not disposed in a region of the bottom cover 400-B4, in which the center light source LSC (refer to FIG. 2) is disposed.

Although some embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
 a display panel comprising a display surface defined therein and curved in a first direction; and
 a backlight unit which provides the display panel with light, wherein the backlight unit comprises:
 a center light source comprising a plurality of center light emitting diode packages and disposed at a center portion of the display panel;
 a plurality of outer light sources, wherein each of the outer light sources comprises a plurality of outer light emitting diode packages, and the outer light sources are arranged in the first direction such that the center light source is disposed between the outer light sources; and
 a reflective layer which reflects the light emitted from the center light source and the outer light sources, and comprises a reflective surface curved in the first direction,
 wherein
 each of the center light emitting diode packages is disposed on a first support surface,
 at least one of the outer light emitting diode packages is disposed on a second support surface, which is different from the reflective surface,
 the second support surface is substantially parallel to an imaginary plane defined by the first direction and a second direction substantially perpendicular to the first direction,
 a third direction is substantially vertical to the first and second directions, and
 a normal line of the second support surface is parallel to the third direction.

2. The display device of claim 1, wherein each of the first and second light emitting diode packages is a top light-emitting diode package.

3. The display device of claim 2, wherein the display surface has a same curvature as the reflective surface.

4. The display device of claim 2, further comprising:
 an optical member disposed between the display panel and the backlight unit,
 wherein the optical member uniformly diffuses the light incident thereto from the backlight unit to allow the diffused light to travel to the display panel.

5. A display device comprising:
 a display panel comprising a display surface defined therein and curved in a first direction; and
 a backlight unit which provides the display panel with light, wherein the backlight unit comprises:
 a center light source comprising a plurality of center light emitting diode packages and disposed at a center portion of the display panel;
 a plurality of outer light sources, wherein each of the outer light sources comprises a plurality of outer light emitting diode packages, and the outer light sources are arranged in the first direction such that the center light source is disposed between the outer light sources; and
 a reflective layer which reflects the light emitted from the center light source and the outer light sources, and comprises a reflective surface curved in the first direction,
 wherein the second support surface is substantially parallel to an imaginary plane defined by the first direction and a second direction substantially perpendicular to the first direction,
 wherein a third direction is substantially vertical to the first and second directions, and
 a normal line of the second support surface and a normal line of the reflective surface of the reflective layer, which is most proximate to the second support surface, are not parallel with each other.

6. The display device of claim 5, wherein
 each of the outer light sources further comprises a plurality of outer circuit board extending in the second direction, and
 each of the outer circuit boards defines the second support surface.

7. The display device of claim 6, wherein
 the number of the outer circuit boards is n,
 a first outer circuit board to an n-th outer circuit board are sequentially arranged in the first direction, and
 the first outer circuit board and the n-th outer circuit board define the second support surface.

8. The display device of claim 6, further comprising:
 a bottom cover which accommodates the display panel and the backlight unit, wherein the bottom cover comprises a bottom surface defined therein and curved in the first direction; and
 a top cover which covers the display panel and is curved in the first direction.

9. The display device of claim 8, wherein a lower portion of each of the outer circuit boards has a same curvature as the bottom surface.

10. The display device of claim 8, wherein
 the bottom cover comprises a plurality of stepped portions, each having a protruding shape,
 each of the stepped portions comprises a stepped surface substantially parallel to the second support surface, and
 one of the outer circuit boards is disposed on the stepped surface.

11. The display device of claim 8, wherein
 the bottom cover comprises a plurality of stepped portions, each having a recessed shape,
 each of the stepped portions comprises a stepped surface substantially parallel to the second support surface, and
 one of the outer circuit boards is disposed on the stepped surface.

12. The display device of claim 8, further comprising:
 a plurality of support members disposed between the bottom cover and the outer circuit boards, and
 a surface of each of the support members, which makes contact with a corresponding outer circuit board of the outer circuit boards, is substantially parallel to the second support surface.

13. The display device of claim 8, wherein the bottom surface defines the reflective surface.

14. A display device comprising:
 a display panel comprising a display surface defined therein and curved in a first direction; and a backlight unit which provides the display panel with light, wherein the backlight unit comprises:

a center light source comprising a plurality of center light emitting diode packages and disposed at a center portion of the display panel;

a plurality of outer light sources, wherein each of the outer light sources comprises a plurality of outer light emitting diode packages, and the outer light sources are arranged in the first direction such that the center light source is disposed between the outer light sources; and a reflective layer which reflects the light emitted from the center light source and the outer light sources, and comprises a reflective surface curved in the first direction, wherein each of the center light emitting diode packages is disposed on a first support surface, and at least one of the outer light emitting diode packages is disposed on a second support surface, which is different from the reflective surface, wherein a third direction is substantially vertical to the first and second directions, and an acute angle between a normal line of the second support surface and the third direction is greater than an acute angle between a normal line of the reflective layer, which overlaps the second support surface, and the third direction.

15. The display device of claim 14, wherein each of the outer light sources further comprises a plurality of outer circuit boards extending in the second direction, and each of the outer circuit boards defines the second support surface.

16. A display device comprising:

a display panel comprising a display surface defined therein and curved in a first direction; and a backlight unit which provides the display panel with light, wherein the backlight unit comprises:

a center light source comprising a plurality of center light emitting diode packages and disposed at a center portion of the display panel;

a plurality of outer light sources, wherein each of the outer light sources comprises a plurality of outer light emitting diode packages, and the outer light sources are arranged in the first direction such that the center light source is disposed between the outer light sources; and a reflective layer which reflects the light emitted from the center light source and the outer light sources, and comprises a reflective surface curved in the first direction;

a bottom cover which accommodates the display panel and the backlight unit, wherein the bottom cover comprises a bottom surface defined therein and curved in the first direction;

a top cover which covers the display panel and curved in the first direction, each of the outer light sources further comprises a plurality of outer circuit boards extending in a second direction substantially vertical to the first direction, each of the outer circuit boards defines the second support surface, each of the center light emitting diode packages is disposed on a first support surface, at least one of the outer light emitting diode packages is disposed on a second support surface, which is different from the reflective surface, a third direction is substantially vertical to the first and second directions, and an acute angle between a normal line of the second support surface and the third direction is greater than an acute angle between a normal line of an outside surface defining the bottom cover, which overlaps the second support surface, and the third direction.

17. The display device of claim 16, wherein the bottom cover comprises a plurality of stepped portions, each having a protruding shape, each of the stepped portions comprises a stepped surface, a normal line of which crosses a normal line of the first support surface, and one of the outer circuit boards is disposed on the stepped surface.

18. The display device of claim 16, wherein the bottom cover comprises a plurality of stepped portions, each having a recessed shape, each of the stepped portions comprises a stepped surface, a normal line of which crosses a normal line of the first support surface, and one of the outer circuit boards is disposed on the stepped surface.

19. The display device of claim 16, further comprising:

a plurality of support members disposed between the bottom cover and the outer circuit substrates, wherein each of the support members has a thickness decreasing as a distance from a center portion of the bottom cover decreases in the first direction.

* * * * *